United States Patent [19]

Stenkvist

[11] Patent Number: 4,468,782
[45] Date of Patent: Aug. 28, 1984

[54] METHOD AND DEVICE FOR OPERATING A DC ARC FURNACE

[75] Inventor: Sven-Einar Stenkvist, Västerås, Sweden

[73] Assignee: ASEA Aktiebolag, Västerås, Sweden

[21] Appl. No.: 443,916

[22] Filed: Nov. 23, 1982

[51] Int. Cl.³ .................................................. F27D 3/14
[52] U.S. Cl. ........................................ 373/84; 373/108
[58] Field of Search ..................... 373/108, 84, 72, 44, 373/45, 102; 266/236, 238, 240, 227, 228, 229

[56] References Cited

U.S. PATENT DOCUMENTS 3,789,127  1/1974  Bowman .............................. 373/108
4,324,943  4/1982  Stenkvist et al. .................. 373/108

Primary Examiner—Roy N. Envall, Jr.
Attorney, Agent, or Firm—Kenyon & Kenyon

[57] ABSTRACT

The present invention relates to a method and a device for operating a DC arc furnace with a bottom in the furnace vat consisting of rammed compound (8) or bricks with metallic elements (7) which are in electrically conductive contact, directly or via electrically conductive bricks (10) such as carbon bricks, with a hearth connection (11). The method is characterized in that, after melting and possibly further treatment of a charge (15), when tapping said melt such a quantity thereof is left that said remainder, the sump (17), may serve as part of a starting electrode for the next melting operation.

2 Claims, 1 Drawing Figure

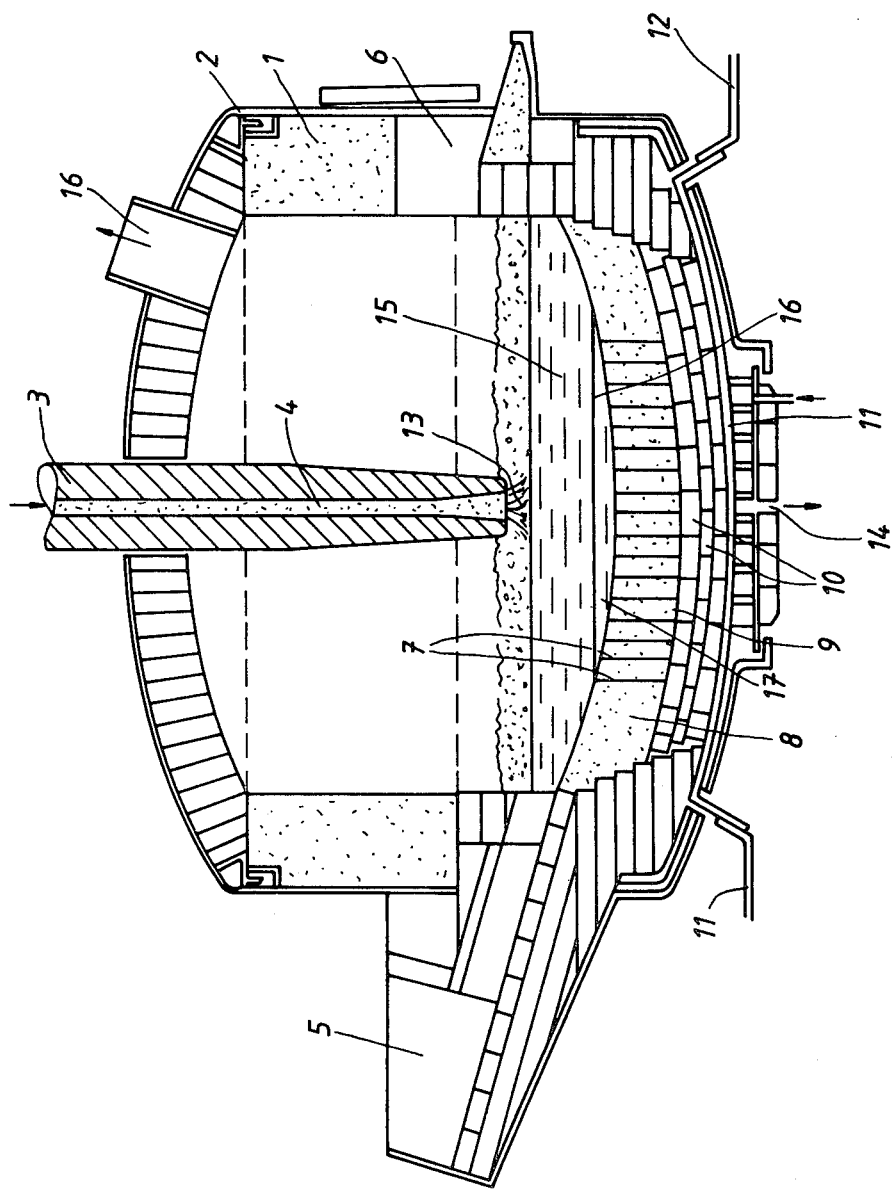

METHOD AND DEVICE FOR OPERATING A DC ARC FURNACE

The present invention relates to a method of operating a DC arc furnace with a bottom in the furnace vessel consisting of rammed compound or bricks with metallic elements, which are in electrically conductive contact with a hearth connection, directly or via electrically conductive bricks, such as carbon bricks. The invention also relates to a hearth connection for a DC arc furnace for carrying out said method. A furnace of such a type with a hearth connection is disclosed in U.S. Pat. No. 4,228,314.

The bottom of the known DC furnace consists of an upper wear lining of known kind and has conducting inserts such as plates or bars of steel. To obtain good operating economy, it is important for the wear lining to remain intact for as long as possible. Slag is often aggressive to such a wear lining and often reduces the life thereof.

The invention aims to provide a solution to the above-mentioned problems and other problems associated therewith in connection with a DC arc furnace. The method is characterised in that, after melting and possible further treatment of a charge, when tapping said melt such a quantity thereof is left that said remainder, the sump, may serve as part of a starting electrode for the next melting operation. The wear on the wear lining is thus reduced by leaving said melt sump, for example molten steel, in the furnace between the different charges. This eliminates the temperature shock which otherwise arises when the furnace is completely discharged and then charged with cold scrap or other cold material. In addition, the sump prevents the slag from coming into contact with the furnace bottom, which is advantageous when the slag acts in a greatly eroding manner on the lining material in the furnace.

Operation with a sump has lately been applied to AC furnaces in such plants where the quality of the tapped steel shall be equal from one charge to another. A disadvantage in this connection is that the bottom cannot be repaired when using a sump from one charge to another in this way.

The counter argument that it is not possible to repair the bottom when operating the furnace with a sump is, however, of minor importance in connection with DC furnaces, since the conductive furnace bottom shall not be repaired. This would mean that the conductive layer would be covered, and therefore the method according to the invention has special advantages in connection with DC arc furnaces. Instead the conductive bottom is here worn down so that a certain minimum thickness remains of the wear lining, for example 100-150 mm. Thereafter, the whole furnace bottom is replaced by a spare unit, which has been prepared at the side of the furnace. See, for example, U.S. Pat. No. 4,277,638. A further advantage in connection with this particular method is that it will not be necessary to use a special starting electrode when operating or running the DC furnace with a sump according to the method of the invention.

The invention also relates to a hearth connection for a DC arc furnace for carrying out the method according to the above, said hearth connection consisting of at least one metallic plate and possibly a layer of electrically conductive bricks, such as carbon bricks, which are in contact with said metallic plate. On these bricks, or in contact with said plate, there is a layer of rammed compound or bricks comprising metallic elements, such as through-going spikes or bars of steel or another metal or alloy. The hearth connection in question is characterised in that it also contains a melt sump from previous charges, which is in contact with the last-mentioned layer. In a preferred embodiment of the hearth connection according to the invention, the sump shall cover the whole of the conductive area of the furnace bottom, possibly also at the normal tilting position for normal tapping. The depth of said molten layer shall suitably be so large that the furnace bottom is not exposed to the slag even when the furnace is tilted for tapping off the normal amount of melt.

The method and the device according to the invention are illustrated in the accompanying FIGURE, which shows a DC arc furnace in cross-section. A furnace vessel 1 is provided with a normal cover or lining of metallic material 2. The number of electrodes/cathodes is one but may be two, three or more, and the electrode may, as in the shown case, be hollow or solid and cathodically connected. The material is normally graphite 3. The channel 4 is used for reduction cases, for example for the production of crude iron, and a solid electrode is normally used for melting. The furnace is provided with a tapping spout 5 and with a deslagging port 6. Below the furnace vessel there is provided a hearth connection, which in the initial position consists of a number of plates or rods 7 of metal extending through a layer 8 of rammed compound or bricks. The bars or plates 7 are continuous and are intended to penetrate into a graphite layer 9, arranged at the boundary surface between the layer 7, 8 of rammed compound and electrically conductive bricks 10, for example carbon bricks, which support the layer of rammed compound. The plates or bars 7 thus penetrate down into the graphite compound 9 and form a good electrical contact therewith and therefore also with the electrically conductive carbon bricks. The carbon bricks are arranged in another layer and terminate in a metallic plate 11, for example of copper or steel, which has a considerable extension along the furnace bottom. The plate may, for example, cover the entire bottom and it is provided with connection contacts 11, 12, intended to be connected to the positive pole of the DC source. It is, of course, possible to use only one contact. The intention with the whole hearth connection and its extension is to obtain an extension of the furnace current along a considerable part of the bottom and around the centre of the furnace, thus substantially preventing obliquity of the arc 13. The hearth connection plate is provided with means for air cooling 14 or liquid cooling, possibly both, and the intention is to maintain said plate at as low a temperature as possible, that is, it shall not be damaged by the heat from the furnace. See the above-mentioned U.S. Pat. No. 4,228,314.

The method according to the present invention is performed as follows: After melting of a charge and possibly further treatment the furnace is discharged down to a limit 16 for the melt 15, where a melt sump 17 is created, covering the conductive portion (7) of the furnace bottom. Possibly, of course, a smaller portion of the sump may be left, but normally it should be at least of the magnitude shown in the FIGURE. Possibly it may be larger so that it will cover the electrically conductive portion of the bottom also in the tilting position for normal tapping of melt, whereby slag will not come into contact with this electrically conductive portion of the bottom, and the wear lining will not become unnecessarily eroded.

The hearth connection comprises the earlier known layers of metal 11, carbon bricks 10 and electrically conductive layers 8, 7, on top of which said melt sump 17 has been arranged, for example a steel or iron melt. Thus a hearth connection is provided, which consists of the different layers as described previously, and a layer of molten metal 17.

The method and the device according to the invention can be varied in many ways within the scope of the following claims.

I claim:

1. A method for operating a DC arc furnace having an arcing electrode and a concave hearth under the electrode and having a centrally localized electrically conductive bottom wear lining portion formed by a refractory through which interspaced metal elements extend from top to bottom and to which portion slag is aggressive, the furnace having controllable means for tapping a melt from the hearth; the method comprising operating the furnace with a molten metal melt in the hearth with slag floating on top of the melt, tapping the furnace so that the melt runs off from the hearth, and stopping the tapping before the melt uncovers the conductive wear lining portion completely and exposes the uncovered portion to the aggressive action of the slag.

2. The method of claim 5 in which said furnace has a tapping spout in one side and can be tilted between a normal working position and a tilted tapping position for melt run-off from the hearth so as to provide said controllable means for tapping the melt from the hearth, and wherein the furnace is tilted to effect said tapping and returned to its normal working position before the melt uncovers any substantial part of said wear lining portion.

* * * * *